US012682533B2

(12) United States Patent
Park et al.

(10) Patent No.: US 12,682,533 B2
(45) Date of Patent: Jul. 14, 2026

(54) METHOD FOR REAL-TIME GENERATION OF EMPATHY EXPRESSION OF VIRTUAL HUMAN BASED ON MULTIMODAL EMOTION RECOGNITION AND ARTIFICIAL INTELLIGENCE SYSTEM USING THE METHOD

(71) Applicant: Sangmyung University Industry-Academy Cooperation Foundation, Seoul (KR)

(72) Inventors: Sung Jun Park, Seoul (KR); Daeho Yoon, Seoul (KR); Jungmin Lee, Seoul (KR)

(73) Assignee: Sangmyung University Industry-Academy Cooperation Foundation, Seoul (KR)

( * ) Notice: Subject to any disclaimer, the term of this patent is extended or adjusted under 35 U.S.C. 154(b) by 167 days.

(21) Appl. No.: 18/657,909

(22) Filed: May 8, 2024

(65) Prior Publication Data

US 2025/0200855 A1 Jun. 19, 2025

(30) Foreign Application Priority Data

Dec. 13, 2023 (KR) ........................ 10-2023-0181152

(51) Int. Cl.
*G06T 13/40* (2011.01)
*G06F 40/35* (2020.01)
(Continued)

(52) U.S. Cl.
CPC .............. *G06T 13/40* (2013.01); *G06F 40/35* (2020.01); *G06N 3/006* (2013.01); *G06T 13/205* (2013.01); *G06V 10/811* (2022.01); *G06V 40/174* (2022.01)

(58) Field of Classification Search
CPC .... G06F 40/35; G06F 40/30; G06F 2203/011; G06F 3/017; G06V 40/174;
(Continued)

(56) References Cited

U.S. PATENT DOCUMENTS 12,205,577 B1 * 1/2025 Kim .................... G10L 15/1815
2004/0243415 A1 12/2004 Commarford et al.
(Continued)

FOREIGN PATENT DOCUMENTS

KR 10-2006-0004689 A 1/2006
KR 10-1925440 B1 12/2018
(Continued)

OTHER PUBLICATIONS

Office Action issued May 28, 2025 in corresponding Korean Patent Application No. 10-2023-0181152, with English Translation, 19 pages.
(Continued)

*Primary Examiner* — Xilin Guo
(74) *Attorney, Agent, or Firm* — Panitch Schwarze Belisario & Nadel LLP

(57) ABSTRACT

Provided are a conversational artificial intelligence (AI) system and method based on real-time multimodal emotion recognition. The system includes a model server configured to provide a machine learning-based conversational model, a terminal configured to perform a conversation with the machine learning-based conversational model through the model server, display a virtual human responding to a user during a conversation with the user, and capture a facial image of the user during the conversation, and a multimodal empathetic conversation-generation system configured to access the model server and receive a response to a question of the user from the terminal, and assess an emotion of the user from the facial image of the user and control, based on the assessed emotion, an expression of the virtual human displayed on the terminal.

8 Claims, 7 Drawing Sheets

(51) Int. Cl.

| | | |
|---|---|---|
| *G06N 3/006* | (2023.01) | |
| *G06T 13/20* | (2011.01) | |
| *G06V 10/80* | (2022.01) | |
| *G06V 40/16* | (2022.01) | |

(58) Field of Classification Search
CPC ..... G06V 10/811; G06T 13/205; G06T 13/40; G06T 7/0014; G06N 3/092; G06N 3/091; G06N 3/006; G06N 3/0475; G06N 3/098; G06N 20/00; G10L 15/26
See application file for complete search history.

(56) References Cited

U.S. PATENT DOCUMENTS

| | | | | |
|---|---|---|---|---|
| 2023/0099393 A1* | 3/2023 | Tumuluri | ............... | G06N 10/00 |
| | | | | 704/231 |
| 2023/0197274 A1* | 6/2023 | Kim | ........................ | G16H 50/30 |
| | | | | 705/2 |
| 2025/0181989 A1* | 6/2025 | Muthusamy | ........... | G06N 20/00 |

FOREIGN PATENT DOCUMENTS

| | | |
|---|---|---|
| KR | 102507809 B1 | 3/2023 |
| KR | 102507811 B1 | 3/2023 |

OTHER PUBLICATIONS

Bill, Desiree et al., Fine-Tuning a LLM Using Reinforcement Learning from Human Feedback for a Therapy Chatbot Application, Bachelor Thesis School of Electrical Engineering and Computer Science at Royal Institute of Technology, 2023, Stockholm Sweden 2023, 15 pages.

Kumano, Shiro et al., "Analyzing Interpersonal Empathy via Collective Impressions", IEEE Transactions on Affective Computing, vol. 6, No. 4, Mar. 27, 2015, 14 pages.

Yoon, Deaho et al., "Developing Empathetic Virtual Humans: Mimicking User's Facial and Eye Responses", 2023, 2 pages.

Rashkin, Hannah et al., "I Know the Feeling: Learning to Converse With Empathy", Paul G. Allen School of Computer & Science Engineering, University of Washington, Nov. 1, 2018, 13 pgs.

* cited by examiner

FIG. 5

| Blend Shape | Description | Muscular Basis |
| --- | --- | --- |
| AU1 | Inner brow raiser | Frontalis, Pars medialis |
| AU2 | Outer brow raiser | Frontalis, Pars lateralis |
| AU4 | Brow lowerer | Depressor glabellae, Depressor supercilli, Corrugator supercilli |
| AU5 | Upper lid raiser | Levator palpebrae superioris |
| AU6 | Cheek raiser | Orbicularis oculi, Pars orbitalis |
| AU7 | Lid tightener | Orbicularis oculi, Pars palpebralis |
| AU9 | Nose wrinkler | Levator labii superioris alaeque nasi |
| AU10 | Upper lip raiser | Levator labii superioris, Caput infraorbitalis |
| AU12 | Lip corner puller | Zygomaticus major |
| AU14 | Dimpler | Buccinator |
| AU15 | Lip corner depressor | Depressor anguli oris (Triangularis) |
| AU17 | Chin raiser | Mentalis |
| AU20 | Lip stretcher | Risorius |
| AU23 | Lip tightener | Orbicularis oris |
| AU25 | Lips part | Depressor labii, Relaxation of mentalis (AU17), Orbicularis oris |
| AU26 | Jaw drop | Masseter, Temporal and Internal pterygoid relaxed |
| AU28 | Lip suck | Orbicularis oris |
| AU45 | Blink | Relaxation of levator palpebrae and Contraction of orbicularis oculi, Pars palpebralis. |
| Shape1 | Expansion of the lower jaw bone | Mandible ramus extension |
| Shape2 | Contraction of the lower jaw bone | Mandible ramus compression |
| Shape3 | Expansion of the lower jaw | Chin extension |
| Shape4 | Contraction of the lower jaw | Chin compression |

METHOD FOR REAL-TIME GENERATION OF EMPATHY EXPRESSION OF VIRTUAL HUMAN BASED ON MULTIMODAL EMOTION RECOGNITION AND ARTIFICIAL INTELLIGENCE SYSTEM USING THE METHOD

CROSS-REFERENCE TO RELATED APPLICATION

This application is based on and claims priority under 35 U.S.C. § 119 to Korean Patent Application No. 10-2023-0181152, filed on Dec. 13, 2023, in the Korean Intellectual Property Office, the disclosure of which is incorporated by reference herein in its entirety.

BACKGROUND

1. Field

The disclosure relates to a method for a virtual human to empathize with a user and express the degree of empathy in an environment in which the virtual human and the user converse with each other, and a conversational artificial intelligence (AI) system using the method.

2. Description of the Related Art

At the present technical level, conversations with artificial intelligence (AI) are largely performed through a text-based conversation system or a voice-based conversation system.

The text-based conversation system, which has mainly the form of a chatbot or a virtual assistant, is used to generate a reply or perform an operation in response to a question input by a user. Recently, a language model such as GPT-3, which has excellent performance in understanding and generating of a natural language, has been used in the text-based conversation system.

The voice-based conversation system understands a voice command and generates an appropriate response by using both of a voice recognition technique and a natural language processing technique. These conversation systems are basically based on pre-trained models and dynamically generate responses according to an input of a user.

Rashkin, et al. have proposed an AI model by forming 25K conversation sets for enabling an empathetic conversation with a user, and Kumano, et al. have introduced a model for predicting a facial expression and a gaze of the eyes through a Bayesian method.

However, these models are based on unimodal methods and thus are not capable of delivering more complex emotions and are limited in expressing emotions.

SUMMARY

Provided are a method for real-time generation of an empathy expression of a virtual human based on multimodal emotion recognition, and a conversational artificial intelligence (AI) system using the method.

Provided are a method for real-time generation of an empathy expression of a virtual human, based on multimodal emotion recognition, whereby a voice-based conversation and user information of a facial expression based on an image are recognized based on a multimodal method (or approach), and a conversational AI system using the method.

Provided are a method for real-time generation of an empathy expression of a virtual human, based on multimodal emotion recognition, whereby a text and/or voice-based conversation and an expression of a user during a conversation are detected and emotions of an expression and a conversation of a virtual human are expressed to be synchronized with an emotion of the user, and a conversational AI system using the method.

Additional aspects will be set forth in part in the description which follows and, in part, will be apparent from the description, or may be learned by practice of the presented embodiments of the disclosure.

According to an aspect of the disclosure, a conversational artificial intelligence (AI) system based on real-time multimodal emotion recognition includes a model server configured to provide a machine learning-based conversational model, a terminal configured to perform a conversation with the machine learning-based conversational model through the model server, display a virtual human responding to a user during a conversation with the user, and capture a facial image of the user during the conversation, and a multimodal empathetic conversation-generation system configured to access the model server and receive a response to a question of the user from the terminal, and assess an emotion of the user from the facial image of the user and control, based on the assessed emotion, an expression of the virtual human displayed on the terminal.

According to one or more embodiments, the model server may include reinforcement learning from human feedback (RLHF)-based large language models (LLMs).

According to one or more embodiments, the terminal may include a capturing unit including a camera photographing a face of the user and a recording unit including a microphone generating an electrical voice signal of the user.

According to one or more embodiments, the terminal may further include an input window configured to display text returned from the multimodal empathetic conversation-generation system to be correctable.

According to one or more embodiments, the multimodal empathetic conversation-generation system or the terminal further may include a voice-text conversion unit and an emotion recognition unit configured to recognize an emotion inherent in a voice of the user by analyzing text from the voice-text conversion unit.

According to one or more embodiments, the multimodal empathetic conversation-generation system may further include an image emotion recognition unit configured to analyze the facial image from the terminal to recognize an emotion of the user in the image and a composite emotion recognition unit configured to recognize a composite emotion by combining the emotion obtained from the text with the emotion obtained from the image.

According to one or more embodiments, the multimodal empathetic conversation-generation system may further include an image emotion recognition unit configured to analyze the facial image from the terminal to recognize an emotion of the user in the image and an empathetic expression generation unit configured to recognize a composite emotion by combining the emotion obtained from the text with the emotion obtained from the image and control the expression of the virtual human displayed on the terminal.

According to one or more embodiments, the multimodal empathetic conversation-generation system may further include an image emotion recognition unit configured to analyze the facial image from the terminal to recognize an emotion of the user in the image, a composite emotion recognition unit configured to recognize a composite emotion by combining the emotion obtained from the text with the emotion obtained from the image, and an empathetic expression generation unit configured to control, based on the composite emotion, the expression of the virtual human displayed on the terminal.

According to one or more embodiments, the empathetic expression generation unit may be further configured to control or manipulate the expression of the virtual human by applying the composite emotion to a rule for converting an emotion recognition result value into a variable for manipulating the expression of the virtual human.

According to one or more embodiments, the model server, the terminal, and the multimodal empathetic conversation-generation system may be connected to one another through a communication network, and the communication network may be accessed by a database storing information related to a conversation between the user and the virtual human.

According to another aspect of the disclosure, a conversation generation method based on real-time multimodal emotion recognition includes providing, via a model server, a conversational model, displaying a virtual human through a display and obtaining a facial image of a user and recording a voice of the user, via a terminal used by the user to perform a voice conversation with the conversational model, via a multimodal empathetic conversation-generation system, accessing the model server and receiving a response to a question of the user from the terminal, assessing a composite emotion of the user based on an emotion inherent in the question of the user and the facial image, and based on the assessed composite emotion, controlling an expression of the virtual human displayed on the terminal.

According to one or more embodiments, the terminal may be configured to transmit, to the multimodal empathetic conversation-generation system, image data obtained by photographing a face of the user and voice data obtained by recording a voice of the user, and the multimodal empathetic conversation-generation system may be configured to comprehensively recognize an emotion of the user by analyzing each of the image data and the voice data and manipulate the expression of the virtual human displayed on the terminal.

According to one or more embodiments, the terminal may further be configured to provide an input window configured to display text returned from the multimodal empathetic conversation-generation system to be correctable.

According to one or more embodiments, any one of the multimodal empathetic conversation-generation system or the terminal may be configured to convert the voice of the user into text, and the multimodal empathetic conversation-generation system may further be configured to recognize an emotion inherent in the voice of the user by analyzing the text.

According to one or more embodiments, the multimodal empathetic conversation-generation system may further be configured to recognize an emotion of the user in the image by analyzing the facial image from the terminal, recognize a composite emotion by combining the emotion obtained from the text with the emotion obtained from the facial image, and control the expression of the virtual human displayed on the terminal.

According to one or more embodiments, the multimodal empathetic conversation-generation unit may further be configured to control or manipulate the expression of the virtual human by applying the composite emotion to a rule for converting an emotion recognition result value into a variable for manipulating the expression of the virtual human.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 shows action units (AUs) defining motions of facial muscles for determining a change in a facial expression;

DETAILED DESCRIPTION

Figure 1:
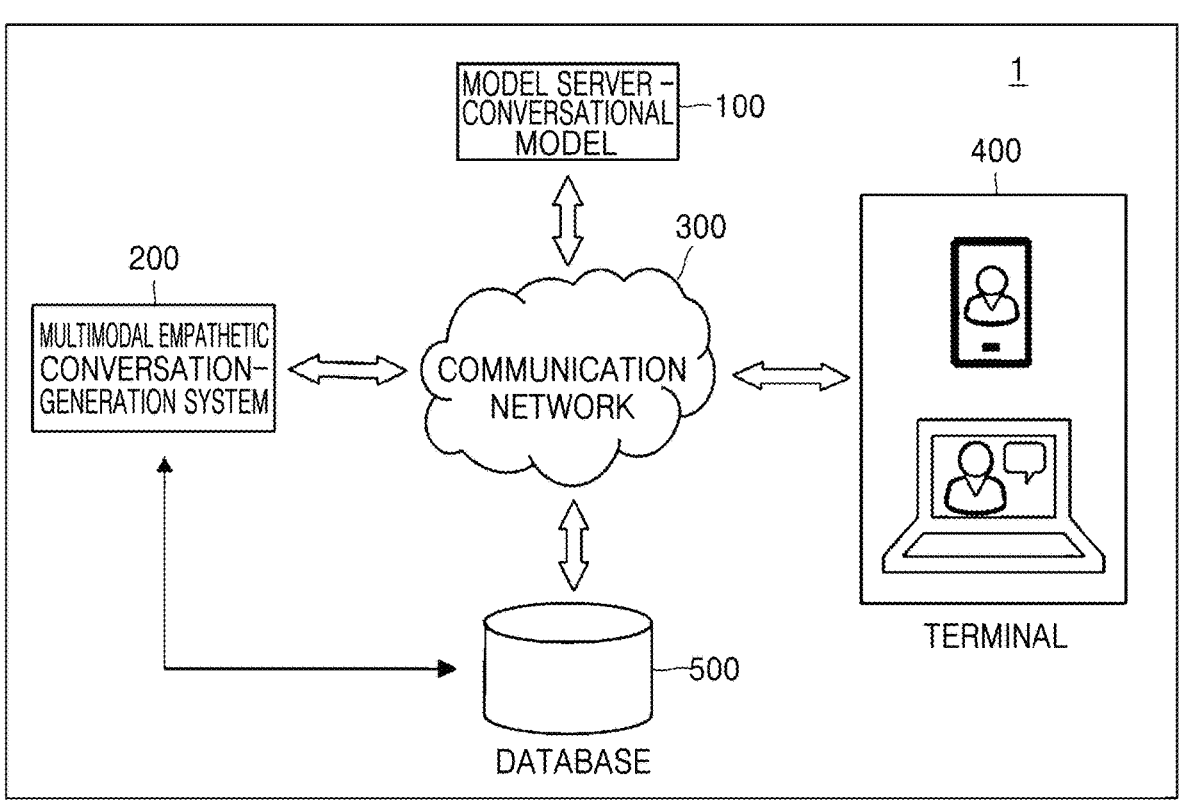
FIG. 1 schematically illustrates a conversational artificial intelligence (AI) system using a method for real-time generation of an empathy expression of a virtual human based on multimodal emotion recognition, according to the disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments will be described in detail with reference to the accompanying drawings. However, embodiments may be modified in various different forms and the scope of the disclosure shall not be interpreted to be limited to the embodiments described hereinafter. It is desirable to understand that the embodiments are described to relatively more fully explain the disclosure to one of ordinary skill in the art. The same reference numerals denote the same elements throughout. Furthermore, various elements and areas in the drawings are schematically illustrated. Thus, the disclosure is not limited by relative sizes or distances shown in the accompanying drawings.

The terms, such as "first," "second," etc., may be used to describe various components, but the components shall not be limited by the terms. These terms are used only for distinguishing one element from another element. For example, without deviating from the scope of the claims of the disclosure, a first element may be referred to as a second element, and in contrast, the second element may be referred to as the first element.

Terms used in the present application are used only for describing particular embodiments of the disclosure and are not intended to limit the disclosure. A singular expression may include a plural expression, unless an apparently different meaning is indicated in the context. With respect to the present application, it will be further understood that the expressions "comprises" and "comprising" used herein specify the presence of stated features, integers, steps, operations, members, components, and/or groups thereof, but do not preclude the presence or addition of one or more other features, integers, operations, members, components, and/or groups thereof.

Unless defined otherwise, all of the terms used herein, including technical terms and scientific terms, have the same meaning as the meaning commonly understood by one of ordinary skill in the art. Also, the terms commonly used and having the meanings as defined in dictionaries shall be understood to have consistent meanings with the corresponding terms in the context of relevant arts, and unless explicitly defined so herein, the meanings of the terms shall not be understood to be excessively formal.

When a certain embodiment may be implemented differently, a specific process order may be performed differently from the described order. For example, two consecutively described processes may be performed substantially at the same time or performed in an order opposite to the described order.

According to an embodiment, a virtual human displayed on a terminal, for example, a personal computer (PC) or a portable terminal, performs, based on a large language model (LLM), a smooth and context-based empathetic conversation with a user, recognizes an emotion of the user though comprehensive analysis (multimodal emotion recognition) of a facial expression (an image) of the user and conversation content (text) spoken by the user during the conversation, and based on a recognition result value, shows an expression of an emotional state similar to the emotion of the user and performs an emotional conversation in compliance with the emotional state of the user, thereby empathizing with the user. Also, according to a method according to the disclosure, even in a situation where a user is not speaking, empathy may be expressed by performing emotion recognition based on a facial expression of the user.

Hereinafter, according to one or more embodiments, a method and system for real-time generation of an empathy expression of a virtual human, based on multimodal emotion recognition, will be described in detail.

FIG. 1 illustrates a schematic structure of a conversational artificial intelligence (AI) system 1, that is, an AI-based conversational system using a method for real-time generation of an empathy expression of a virtual human based on multimodal emotion recognition, according to the disclosure.

Referring to FIG. 1, the conversational AI system 1 according to the disclosure includes a conversational model 100, a multimodal empathetic conversation-generation system 200, a terminal 400, and a database 500 configured to communicate with one another through a communication network 300, such as the Internet, etc.

The communication network 300 may include most of existing wired and wireless communication systems, such as the Internet, a wide area network (WAN), a wired local area network (LAN), a wireless LAN, a 3$^{rd}$ generation mobile network (3G), a 4$^{th}$ generation mobile network (4G), a 5$^{th}$ generation mobile network (5G), long term evolution (LTE), etc., and may also use various communication protocols. The technical scope of the communication network 300 according to the disclosure is not limited by predetermined systems and predetermined protocols.

The database 500 may be accessed by the multimodal empathetic conversation-generation system 200 and may be accessed by a local area network (LAN) in a local directory or may be arranged in the multimodal empathetic conversation-generation system 200. The database 500 may store personal information, access information, content of a conversation of a user, etc., so that based on the stored content of the conversation, the user may continue the subsequent conversation with reference to the content of the conversation. For example, if the user said in yesterday's conversation that he/she was sick, the content may be stored in the database 500, and in the next day's conversation, he/she could be asked, for example, how he/she feels.

The conversational model 100 at the highest layer of the conversational AI system 1 according to the disclosure may be configured to understand a natural language sentence and extract the meaning thereof, based on a natural language processing technique which is input by the user through the terminal 400, and may be configured to generate a response based on knowledge or data that is previously learnt. The conversational model 100 may use, for example, a generative pre-trained transformer (GPT) model configured to perform language understanding and generation by being previously trained with a large volume of text data, or a model in a form of a new outcome of transfer learning, in particular, a new model which is capable of effectively processing the Korean language or other languages.

In detail, the conversational model 100 of a model server may include a model, for example, ChatGPT, which is obtained by applying the reinforcement learning from human feedback (RLHF) technique to LLMs trained by using a large volume of data. The LLM may be a type of natural language processing model trained based on a large volume of text data and may be designed to generate relatively more natural and consistent text by receiving original text or sentences as an input by using a different natural language generation model in the model. The RLHF technique, one of methods of training a machine learning model, is used for improving a model by using human feedback and is related to reinforcement learning.

By using the terminal 400, the user may subsequently access the multimodal empathetic conversation-generation system 200 through the Web. Through the terminal 400, a question of the user may be input and a response thereto may be generated. Also, the terminal 400 may display a virtual human performing a conversation with the user. The virtual human may show various emotional expressions during the conversation with the user.

The question of the user may basically include a text input, and according to another embodiment, a voice signal may be received and may be changed into text. The changing of the voice signal into the text may be performed directly by the terminal 400, and according to another embodiment, may be performed by a general algorithm in the multimodal empathetic conversation-generation system 200 accessed by the terminal 400. The terminal 400 may extract a facial area of the user from a facial image obtained through a photographing unit having a video camera, for example, a webcam, which is a video-obtaining device, and may analyze an emotion of the user indicated in the extracted facial area. Based on an emotion-analysis result value, the terminal 400 may manipulate an expression of the virtual human to represent an emotional state similar to an emotional state of the user.

The terminal 400 may indicate all types of electronic devices including a desktop PC, a portable PC, a notebook computer, an Android terminal, an iOS terminal, etc., which may access the multimodal empathetic conversation-generation system 200 and perform a conversation.

While a conversation with the user is being maintained through the terminal 400, the multimodal empathetic conversation-generation system 200 may assess an emotion of the user by analyzing a voice and an image transmitted from the terminal 400 and continue the conversation. Simultaneously, the multimodal empathetic conversation-generation system 200 may change the expression of the virtual human according to a result of the assessment of the emotion through the analysis of the image and the voice of the user. According to the present embodiment, it is described that the analysis of the image is generated in the multimodal empathetic conversation-generation system 200. However, according to another embodiment, the analysis of the image may be generated in the terminal 400. This aspect may denote that analysis of an emotional state through an image may be executed in any component of the AI system 1.

Figure 2:
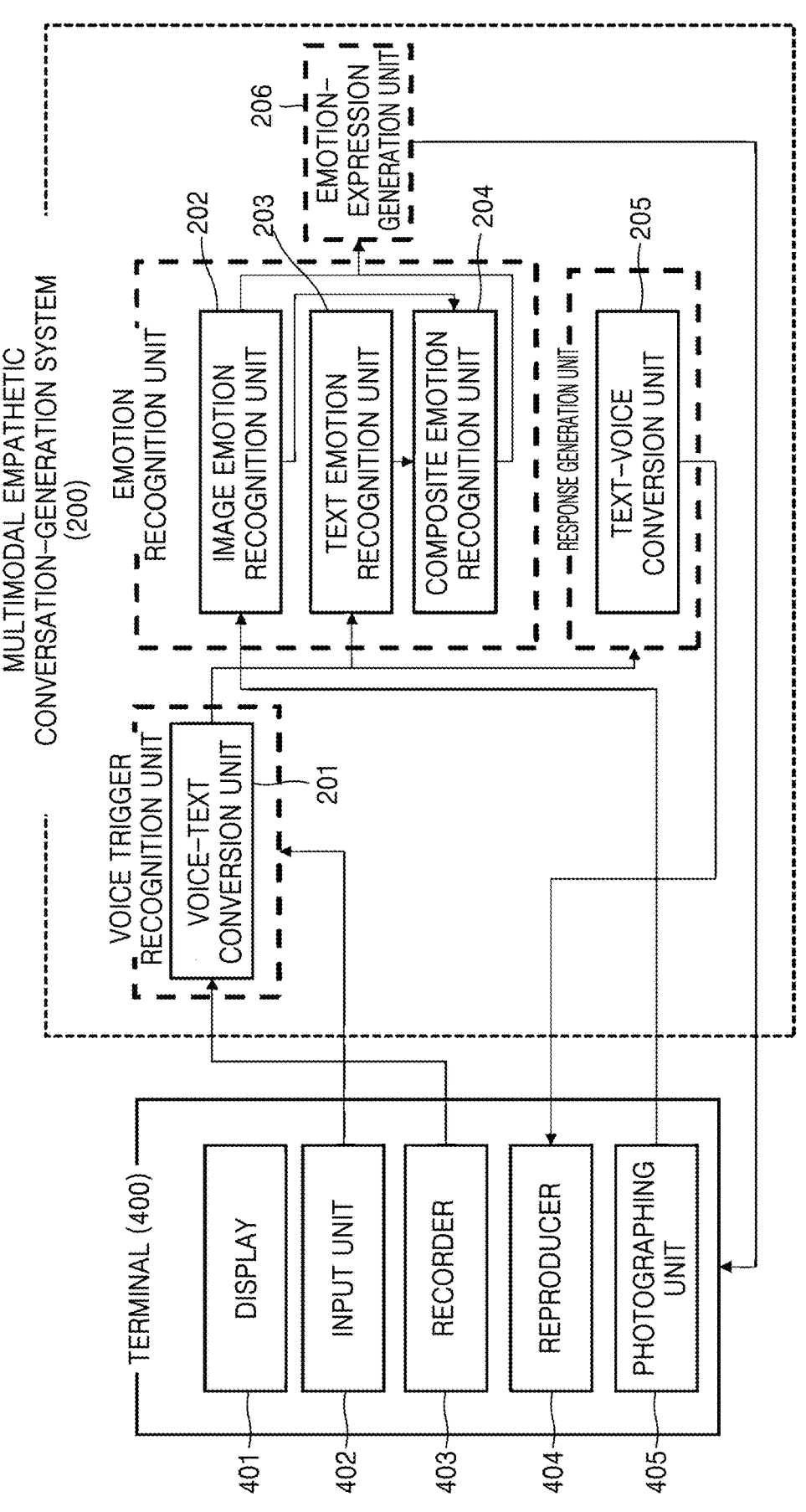
FIG. 2 is a block diagram of schematic structures of a multimodal empathetic conversation-generation system according to the disclosure.

FIG. 2 illustrates a process in which image data and voice data are processed by the multimodal empathetic conversation-generation system 200 and the terminal 400 and shows a relationship between the multimodal empathetic conversation-generation system 200 and the terminal 400, which is realized in the multimodal empathetic conversation-generation system 200.

The terminal 400 may have a general structure and may include a display 401, a text input unit 402, a voice recorder 403, a voice reproducer 404, and a photographing unit 405 as hardware and application-based internal devices.

The display 401 may display a dynamic virtual human and may display content of an exchanged conversation. According to an embodiment, the display 401 may be in the form of a graphics user interface (GUI) and may provide the text input unit 402 and one or more instruction buttons for start/end operations, etc.

The text input unit 402 may receive user input text. However, the text input unit 402 may also show voice data converted into text to the user so that the user may correct the converted text, before the text input unit 402 transmits the converted text to an LLM.

The voice recorder 403 may record a voice of the user and the recorded voice data may be digitalized and transmitted to the multimodal empathetic conversation-generation system 200. The voice reproducer 404 may provide a voice signal received form the multimodal empathetic conversation-generation system 200 to the user. The photographing unit 405 having a camera and an image recorder may photograph a face of the user and the captured image data may be transmitted to the multimodal empathetic conversation-generation system 200.

The terminal 400 may indicate all types of electronic devices including a desktop PC, a portable PC, a notebook computer, an Android terminal, an iOS terminal, etc., which may access the multimodal empathetic conversation-generation system 200 and perform a conversation.

While a conversation with the user is being performed by the terminal 400, the multimodal empathetic conversation-generation system 200 may provide a response to a question, etc. of the user or text or sound corresponding to a detected emotion of the user, at an appropriate point in time, and may control an expression, etc. of a virtual human displayed on the terminal 400 to correspond to or comply with an emotion of the user.

The multimodal empathetic conversation-generation system 200 may transmit the sound of a conversational question or response generated by the text to speech (TTS) technique, wherein the sound may be embodied in various speaking styles and voices. Also, an emotion-expression generation unit 206 may transmit virtual human control data for controlling an expression of the virtual human displayed on the terminal 400, based on a question and an expression of the user.

A voice trigger recognition unit may determine whether or not a voice input from the voice recorder 403 of the user terminal 400 or a text input from the input unit 402 is started, that is, whether or not a voice trigger is started, and when the voice trigger is recognized, may receive a voice signal and a text signal and transmit resultant text to an emotion recognition unit. A voice-text conversion unit 201 of the voice trigger recognition unit may convert the voice signal from the terminal 400 into text.

The emotion recognition unit may include an image-emotion recognition unit 202, a text-emotion recognition unit 203, and a composite-emotion recognition unit 204. The image-emotion recognition unit 202 may recognize an emotion of a user from an image signal from the terminal 400, and the text-emotion recognition unit 203 may recognize an emotion inherent in text.

Results from the image-emotion recognition unit 202 and the text-emotion recognition unit 203 may be transmitted to the composite-emotion recognition unit 204. The composite-emotion recognition unit 204 may recognize an emotion of the user by combining the emotion obtained from the image and the emotion obtained from the text.

The emotion-expression generation unit 206 described above may receive result values from the image-emotion recognition unit 202 and the composite-emotion recognition unit 204 and may generate a signal for controlling an expression of a virtual human displayed on the terminal 4000 and transmit the signal to the terminal 400.

A response generation unit may perform a conversation between the user and the conversational model 100. That is, the text that is converted from the voice data from the user or the text corrected by the user after being converted may be transmitted to the conversational model 100 and the text retrieved therefrom may be transmitted to the terminal 400 of the user.

The voice data from the terminal 400 may be input to the voice-text conversion unit 201 of the multimodal empathetic conversation-generation system 200 and may be converted into text, the converted text may be transmitted to the text-emotion recognition unit 203, and the text-emotion recognition unit 203 may assess an emotion of the user in the text. Also, the image data from the terminal 400 may be transmitted to the image-emotion recognition unit 202 of the emotion recognition unit, and an emotion inherent in the image may be assessed.

The image emotion information and the text emotion information obtained from the image-emotion recognition unit 202 and the text-emotion recognition unit 203, respectively, may be transmitted to the composite-emotion recognition unit 204 configured to determine a composite emotion of the user. A finally assessed emotion obtained from the composite-emotion recognition unit 204 may be transmitted to the emotion-expression generation unit 206, so that a virtual human having an expression corresponding to the finally assessed emotion may be generated or virtual human expression control data therefor may be formed.

The text-voice conversion unit 205 may transmit, to the terminal 400, a response of an LLM, etc. in response to the user voice input from the voice-text conversion unit 201.

Figure 3:
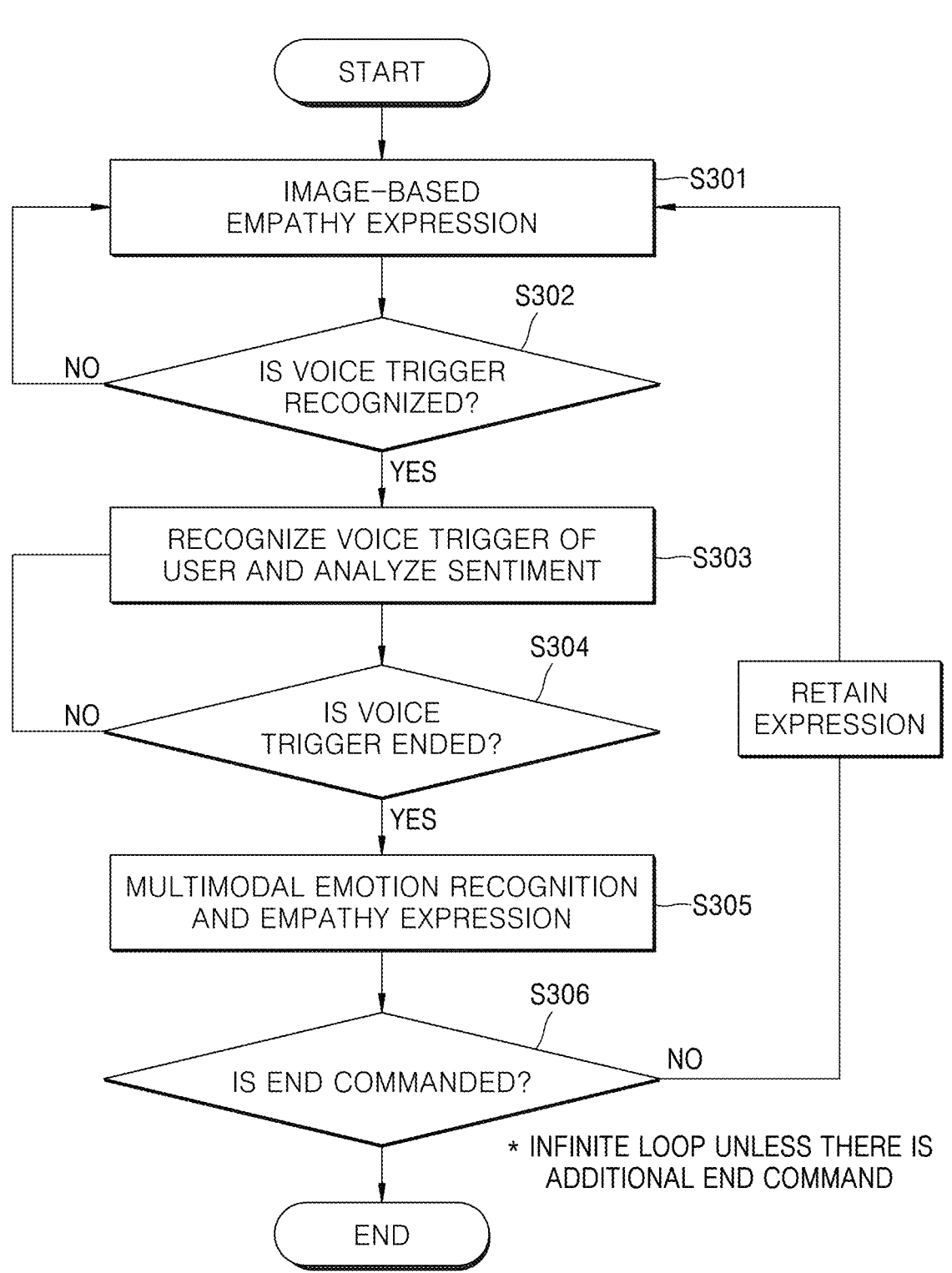
FIG. 3 is a schematic flowchart of an image-based empathy expression method according to the disclosure.

Hereinafter, by referring to FIG. 2 above and FIG. 3 that is a flowchart of an overall conversation process, a specific method, performed by the system, of generating an empathetic conversation, will be described in detail.

Described below are real-time orders of the technique according to the disclosure in a conversational environment with a user, the real-time orders being illustrated in FIG. 3. In the description of the orders, specific techniques used in each order are included.

Operation S301: Image-Based Empathy Expression

Operation S301 is performed in a state in which a conversation has not yet been performed. In operation S301, a facial area of a user may be extracted through a video photographing device, such as a webcam, etc., and an emotion of the user may be analyzed based on the extracted facial area. An emotional state similar as an emotional state of the user may be represented by manipulating, based on a result value of the analyzed emotion, an expression of a virtual human displayed on a terminal.

A. Extraction of the Facial Area of the User

To detect the facial area from a facial image, a face detection technique is used. As the face detection technique, a model trained based on a machine-learning (ML)-based modeling method, such as a computer vision algorithm such as Viola Jones or a deep learning algorithm, may be used.

B. Inference of an Emotion of the User

For the inference of the emotion from the extracted facial area, a facial expression recognition technique may be used. For example, a rule-based model may be used by extracting features using a computer-vision algorithm, such as a histogram of gradient (HOG) or a local binary pattern (LBP), or a model trained based on an ML-based modeling method, such as a deep learning algorithm, may be used.

C. Generation of an Empathetic Expression of the Virtual Human

Data for controlling the expression of the virtual human may be generated based on the emotion recognition result, and the expression of the virtual human displayed on the terminal may be controlled or manipulated, which may be understood in detail with reference to the description of operation S305.

Operation S301 above may be repetitively performed, unless there is utterance from the user and unless there is forcible control by the user.

Operation S303: Recognition of User Utterance and Analysis of Emotion

When a voice trigger of the user, that is, utterance, is detected (S302), a sound input device (a microphone) may be activated to receive a voice signal of the user, and the voice signal of the user may be recorded through the voice recorder 403. The voice of the user may be converted into text by using an automatic speech recognition (ASR) technique. Before the voice of the user converted into the text is transmitted to an LLM, the converted text may be shown to the user so that the user may correct the text by using an input unit of the terminal to increase the degree of completion of a sentence. This correction process may be optional and may thus be omitted. The text of the completed sentence may be used to recognize an emotional state of the user by using a sentimental analysis method.

A. Voice Trigger

An automatic voice trigger detection technique that is triggered when a predetermined keyword is detected, etc. may be used. Representative voice trigger words may include "Hi Google," "Hello Bixby," and "Aria (a Nugu speaker of the SK Telecom)." When a voice trigger is triggered, a microphone of the terminal may be open, and all signals of subsequent utterance of the user may be input and processed. Alternatively, the voice trigger may not be used, and the microphone may be configured to be open when a user presses on a predetermined button. A code for processing the voice trigger may not be stored in a cloud. Rather, the code may be stored in the system in which the virtual human is displayed, for example, the terminal of the user.

B. Automatic Speech Recognition (ASR)

An exclusive ASR technique may be used, or a commercialized service, such as Naver CLOVA, etc. may be used. Whether the ASR technique is used or the Naver CLOVA is used, communication (input and output operations) with an ASR AI decoder may be necessary. Input information may be a voice trigger signal (analog) of the user, and output information may be a text string obtained by digitalizing the analog voice signal. The ASR model may be stored in a local directory, a cloud or a conversation-generation system. In the case of the latter, a communication module may have to be provided in the local terminal.

C. Sentimental Analysis

A word in which a sentiment of a sentence is embedded may be detected from input text, and the word in which the sentiment is embedded may be used to estimate in which emotional state the corresponding sentence is uttered. (For example, "happy": a happy sentiment, "joyful": an excited sentiment, "irritated": a vexed sentiment, "sad": a mournful sentiment, etc.) As another method, an AI model may be trained by labelling a sentiment for each sentence, and the trained model may be used. (For example, labelling "I have received a lot of birthday presents!" with "happy" or continual values). A method of estimating which text data corresponds to which emotion by using an AI model trained by gathering the data above may also be used. As another method, a generative LLM (for example, GPT) may be asked which emotion is implied in conversation content uttered by the user. A response to the question may be received as a sentence ("Disappointment is implied in the word of the user.") or may be qualitatively received ("the level of arousal of the word of the user is 0.7 (between 0 and 1) and the valence of an emotion is a positive force of 0.7 (between 0 and 1)"). These methods may be used to estimate which emotional state is indicated by the content of the word of the user.

After this process is ended, whether or not utterance is ended may be determined in operation S304, wherein end is Yes, and the process may subsequently proceed to operation S305, and when the utterance is not ended, the process may return to operation S303 and operation S303 may be performed. End point detection (EPD) of the utterance of the user may be additionally received by the user, for example, through a button input, or an automatic utterance end detection technique, etc. may be used.

Operation S305: Multimodal Emotion Recognition and Empathy Expression.

When the user utterance is ended in operation S304, an emotion recognition result (value) analyzed based on text data and an emotion recognition result analyzed based on a facial image collected during the utterance may be combined to analyze a final emotion result of the user. Based on the analyzed final emotion result value, an expression of the virtual human may be manipulated and the sentiment of the word delivered by the virtual human to the user may be manipulated to express an emotion similar to an emotional state of the user. Here, the manipulation of the expression of the virtual human may be gradually performed, and a response of the virtual human may be delivered at a certain point in time at which the expression manipulation is performed.

A. Multimodal Emotion Recognition

Combination of a text-based emotion recognition result and an image-based emotion recognition result: when it is assumed that the two emotion recognition result values infer the same emotional state (for example, arousal or relaxation or a positive or negative emotion) and are represented as continual values (for example, represented as values between −1 to 1, wherein the emotion is negative as the value is closer to −1 and positive as the value is closer to 1), the two emotion recognition result values may be averaged, or a different weight may be given to each of the two emotion recognition result values and then the two emotion recognition result values given with the different weights may be summed. (For example, the emotion value of the image may be multiplied by the weight of 0.7 and the emotion value of the text may be multiplied by the weight of 0.3, and then, the two values may be summed.)

B. Generation of an Empathetic Expression Based on the Emotion Result Value

An empathetic expression may be generated based on the analyzed final emotion-recognition result value. To this end, a rule to manipulate the emotion-recognition result value into a variable for manipulating the expression of the virtual human, for example, BlendShape, may be defined. The rule may be directly set, or a model trained based on an ML based-modeling method, such as a deep learning algorithm, may be used.

An example of the rule may include a method, by which the variable for manipulating the expression of the virtual human is mapped with an action unit (AU) of Ekman and the analyzed emotion result value is linked to an adjacent basic emotion expression (Ekman), which will be described in detail with reference to (1) to (4) below. Here, the Blend-Shape described hereinafter may be mainly used in three-dimensional (3D) character animation and modeling, and in particular, may be an example variable used to generate various facial expressions.

Figure 6:
FIG. 6 illustrates an expressionless state of a virtual human in (A) and a controlled state of the virtual human in a slightly smiling state with both corners of the mouth turned up in (B)

(1) Mapping of the AU with a BlendShape variable (For example, AU6 of "both corners of the mouth turned up" may be mapped with, for example, a variable of "Mouth_Smile" from among the BlendShape (AU) variables. FIG. 6 illustrates an expressionless state of a virtual human in (A) and a controlled state of the virtual human in a slightly smiling Mouth_Smile state with both corners of the mouth turned up in (B).

To this end, appearance features may be detected in the facial area of the user. In an AU detection process, the appearance features of the facial area of the user may include eyebrows, the eyes, the nose, the mouth, and the chin, and the positions of the appearance features may be detected by using 68 landmarks. The landmarks may be defined, for example, based on the facial action coding system (FACS) of Ekman, and the landmarks may use a good-feature-to-track (GFTT) algorithm and a facial landmark detection (FLD) algorithm.

Figure 4:
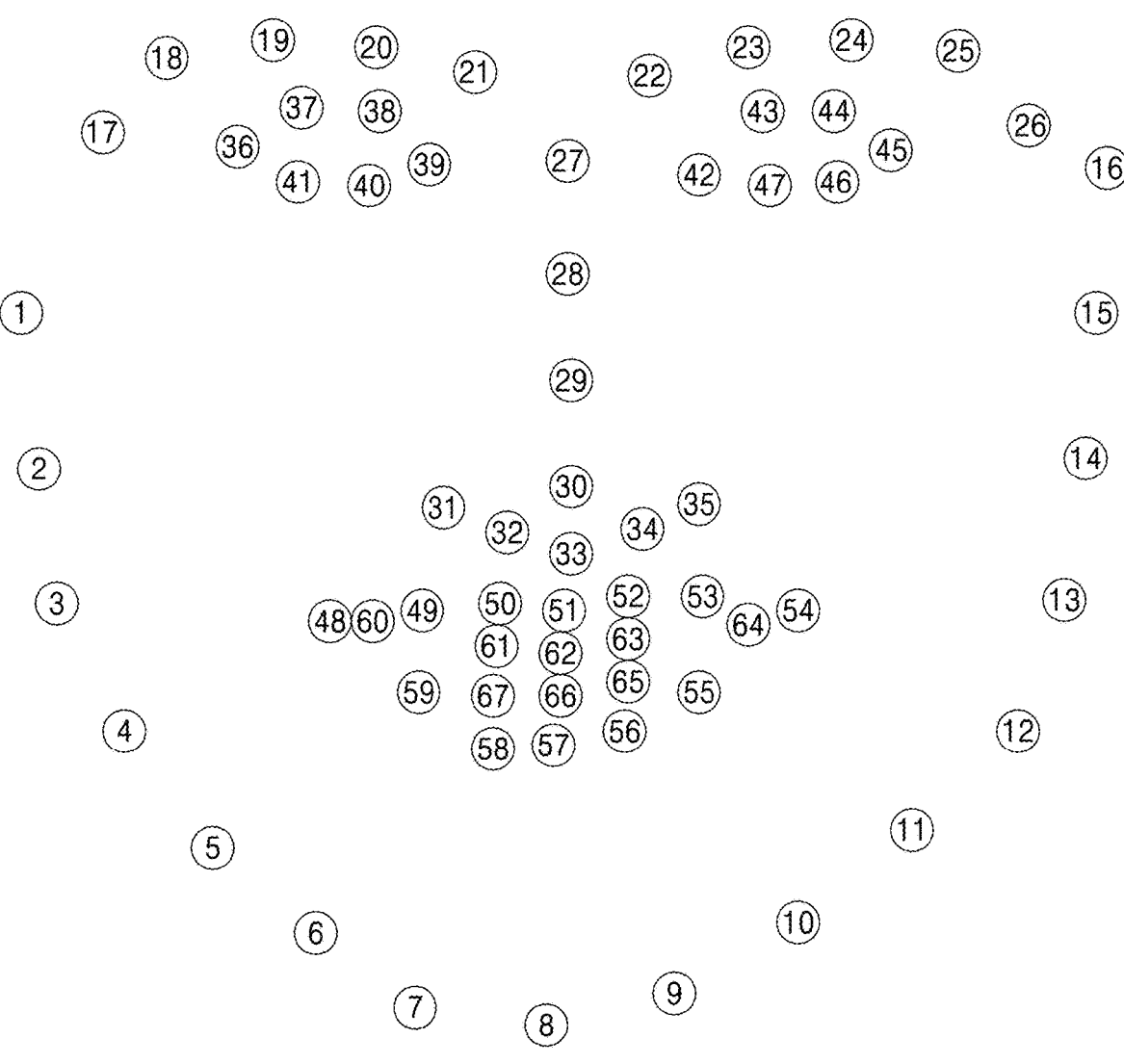
FIG. 4 illustrates an arrangement of landmarks of a face, defined by a facial action coding system (FACS)

FIG. 4 illustrates an arrangement of landmarks defined in the FACS, FIG. 5 shows a list of the AUs (BlendShapes) defining the motion of facial muscles for determining a change in a facial expression, and Table 1 below describes the AUs with respect to FIG. 4 and a landmark included in each AU.

TABLE 1

| AU | Description | Facial Landmarks |
| --- | --- | --- |
| AU 1 | Inner Brow Raise | 18, 19, 20, 21 (Left) |
| | | 22, 23, 24, 25(Right) |
| AU 2 | Outer Brow Raise | 17, 18, 19 (Left) |
| | | 24, 25, 26 (Right) |
| AU 4 | Brow Lowerer | 17, 18, 25, 26 |

TABLE 1-continued

| AU | Description | Facial Landmarks |
| --- | --- | --- |
| AU 5 | Upper Lid Raise | 36, 37, 38, 39 (Left) |
| | | 42, 43, 44, 45 (Right) |
| AU 6 | Check Raise | 41, 2, 31 (Left) |
| | | 46, 14, 35(Right) |
| AU 7 | Lids Tight | 36, 41, 39, 38 (Left) |
| | | 42, 46, 45, 43 (Right) |
| AU 9 | Nose Wrinkle | 30, 31, 33 (Left) |
| | | 30, 33, 35 (Right) |
| AU 12 | Lip Corner Puller | 3, 48, 31 (Left) |
| | | 13, 54, 35 (Right) |
| AU 15 | Lip Corner Depressor | 4, 6, 48 (Left) |
| | | 12, 54, 10 (Right) |
| AU 16 | Lower Lip Depress | 59, 6, 7, 8, 9, 10, 55, 56, 57, 58 |
| AU 20 | Lip Stretch | 3, 4, 5, 48 (Left) |
| | | 11, 12, 13, 54 (Right) |
| AU 23 | Lip Funneler | 50, 58, 56, 52 |
| AU 26 | Jaw Drop | 6, 8, 10, 57 |

(2) In order to control or change the expression of the virtual human, the AUs and the basic emotions may be mapped with each other, for example, based on the AUs of basic emotional expressions (happiness, sadness, anger, fear, distaste, surprise) of Ekman. For example, according to the definition of Ekman, happiness=AU6+AU12.

The virtual human may be generated by using, for example, REALLUSION Character Creator3.

(3) After an extracted emotion recognition result value is mapped with an adjacent basic emotion, a weight is assigned thereto. For example, when a final emotion recognition result value corresponds to the degree of arousal of 0.3 and the positive valence of 0.7, the degree of arousal and the positive valence are classified into predetermined ranges (for example, with the degree of arousal >0 and the positive valence >0, the emotion is classified as "a positive and aroused emotion"), and the corresponding range and a basic emotion are mapped with each other ("positive and aroused"="happiness"+"surprised," and "negative and aroused"="fear"+"distaste"+"anger"). Then, a weight is assigned to each basic emotion (because the positive valence is higher than the degree of arousal, a weight of 0.7 is assigned to the AU of happiness, and a weight of 0.3 is assigned to the AU of surprise). Alternatively, the degree of arousal and the positive valence are represented as points on a two-dimensional plane and are converted into a polar coordinate system, and the weight is determined through a relative rate as to which of 0 degrees and 90 degrees a theta value is close to. Alternatively, an additional image module for classifying the basic emotion ranges may be used, and while the user is speaking, a relative ratio of a recognition frequency value or a probability value of "happiness" and "surprise" may be used.

Figure 7:
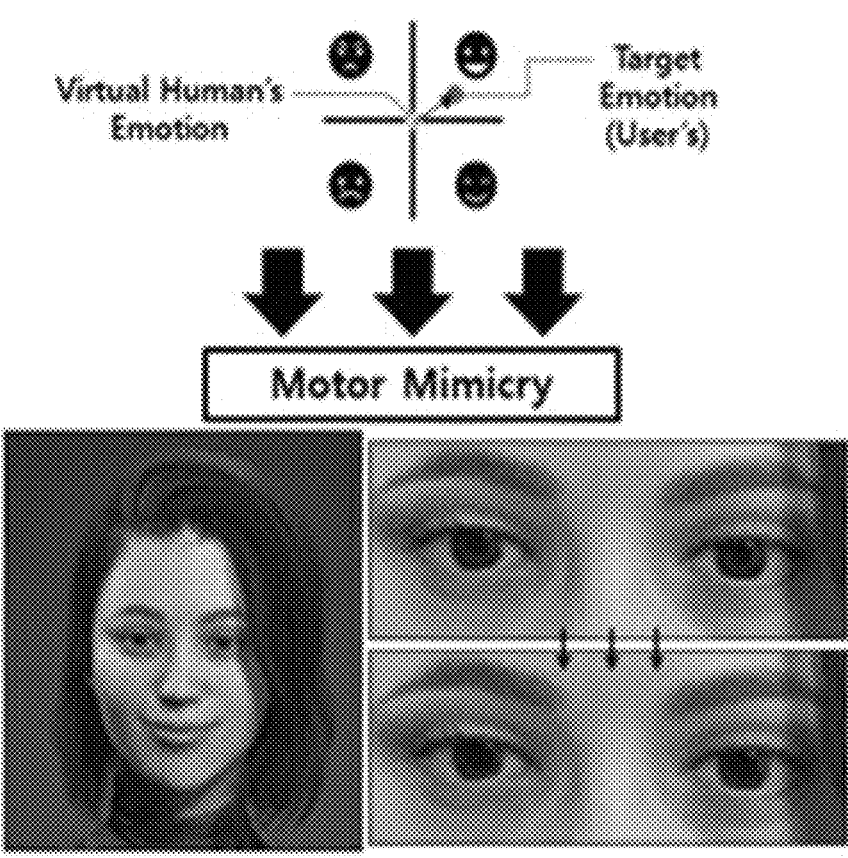
FIG. 7 illustrates manipulation of an expression of another virtual human empathizing with an emotion of a user, according to the disclosure.

(4) Setting an Expressional Intensity of an Expression For example, in the process (iii.) above, an R value calculated when the degree of arousal and the positive valence are converted into the polar coordinate system may be used to set the expressional intensity. FIG. 7 illustrates a process in which an expression of a virtual human is changed by mapping an image emotion detected from a facial image of a user with the virtual human.

D. Gradual Expression Manipulation

When a target expression that has to be generated through the process of the generation of an empathetic expression, is represented as a set of variables of expression manipulation of a virtual human, an increase or a decrease of the variables of the expression manipulation of the virtual human may be gradually represented for a change from a current expression to the target expression. A linear function for increasing the same value in frame units may be used or a non-linear function, such as a log function or an exponential function, may be used.

E. Delivering a Response of the Virtual Human

Response text of the virtual human generated based on the LLM may be converted to a voice of a human being by using the TTS technique, and the converted voice data may be delivered to the user through a sound output device (for example, a speaker). When the response is generated through the LLM, the LLM may be instructed to generate the response having the content in compliance with an emotion of the user by reflecting the multimodal recognition result with respect to the emotion of the user. For example, a response with respect to the word of the user "hello" as a prompt sentence of the LLM may be generated, wherein an emotion of the response should be the arousal of A and the valence of B (A and B are the arousal and valence states of the user, estimated in the multimodal emotion recognition in B. of operation S305 above). The content of the word generated by the LLM may be converted into the voice through the TTS technique. Here, the tone and the manner of the voice of the virtual human may have to have the same arousal and valence as the content of the word generated by the LLM. When a gap occurs between the content and the arousal and the valence, a feeling of distance may occur between the content of the word and the voice expression, and thus, a hearer may feel it unnatural. For example, when the virtual human says "hello!" the tone and the manner must not be too dark or slow.

F. Responding to the User

A time point at which the voice is transmitted may be arbitrarily set by the user. For example, the response may be delivered after the expression manipulation process described in B. of operation S305 is ended, or may be delivered simultaneously with the expression manipulation process.

Operation S306: Retaining of the Expression or Returning to the Original State

After the expression generated in operation S305 above is retained, the expression may return to operation S301 above. A method of adjusting a retaining time and a retaining intensity of the expression may be used. The process in which the retained expression is returned to the state of operation S301 and is changed to a new expression may be gradually performed based on a method described in D. of operation S305.

To summarize the embodiment described in detail above, according to the system, the virtual human empathizes with the user and expresses a degree of empathy in the environment in which the user converses with the virtual human through the terminal. During the conversation, the virtual human may perform a natural and context-based empathetic conversation with the user. During the conversation, the virtual human may comprehensively analyze the facial expression of the user and the utterance of the user based on the multimodal emotion recognition and may express an emotional state similar to an emotional state of the user and perform the conversation in compliance with the emotional state of the user.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by one of ordinary skill in the art that various changes in form and details may be made therein without departing from the spirit and scope as defined by the following claims.

What is claimed is:

1. A conversational artificial intelligence (AI) system based on real-time multimodal emotion recognition, the conversational AI system comprising:
a model server configured to provide a machine learning-based conversational model;
a terminal configured to perform a conversation with the machine learning-based conversational model through the model server, display a virtual human responding to a user during a conversation with the user, and capture a facial image of the user during the conversation; and
a multimodal empathetic conversation-generation system configured to access the model server and receive a response to a question of the user from the terminal, and assess an emotion of the user from the facial image of the user and control, based on the assessed emotion, an expression of the virtual human displayed on the terminal,
wherein the terminal comprises a voice-text conversion unit configured to convert a voice of the user into text, and
wherein the multimodal empathetic conversation-generation system comprises:
an image emotion recognition unit configured to analyze the facial image from the terminal to recognize an emotion of the user in the facial image;
a text emotion recognition unit configured to assess an emotion of the user inherent in the text;
a composite emotion recognition unit configured to recognize a composite emotion by integrating an emotion obtained from the text and an emotion obtained from the facial image; and
an empathetic expression generation unit configured to control or manipulate, by applying the composite emotion to a rule for converting an emotion recognition result value into a variable for manipulating the expression of the virtual human, the expression of the virtual human displayed on the terminal so as to display an empathetic emotion corresponding to the emotion of the user.

2. The conversational AI system of claim 1, wherein the model server comprises reinforcement learning from human feedback (RLHF)-based large language models (LLMs).

3. The conversational AI system of claim 1, wherein the terminal comprises:
a capturing unit including a camera photographing a face of the user; and
a recording unit including a microphone generating an electrical voice signal of the user.

4. The conversational AI system of claim 3, wherein the terminal further comprises an input window configured to display text returned from the multimodal empathetic conversation-generation system to be correctable.

5. The conversational AI system of claim 1, wherein the model server, the terminal, and the multimodal empathetic conversation-generation system are connected to one another through a communication network, and the communication network is accessed by a database storing information related to a conversation between the user and the virtual human.

6. A conversation generation method based on real-time multimodal emotion recognition, the conversation generation method comprising:

providing, via a model server, a conversational model according to claim 1;

displaying a virtual human through a display and obtaining a facial image of a user and recording a voice of the user via a terminal used by the user to perform a voice conversation with the conversational model;

via a multimodal empathetic conversation-generation system, accessing the model server and receiving a response to a question of the user from the terminal and assessing a composite emotion of the user based on an emotion inherent in the question of the user and the facial image, and based on the assessed composite emotion, controlling an expression of the virtual human displayed on the terminal, wherein the multimodal empathetic conversation-generation system analyzes the facial image received from the terminal to recognize an emotion of the user in the image, recognizes an emotion inherent in text converted from the voice of the user, recognizes the composite emotion by integrating the emotion inherent in the voice with the emotion obtained from the facial image, and controls or manipulates the expression of the virtual human displayed on the terminal by applying the composite emotion to a rule for converting an emotion recognition result value into a variable for manipulating the expression of the virtual human so as to display an empathetic emotion corresponding to the emotion of the user.

7. The conversation generation method of claim 6, wherein the model server comprises reinforcement learning from human feedback (RLHF)-based large language models (LLMs).

8. The conversation generation method of claim 7, wherein the terminal is further configured to provide an input window configured to display text returned from the multimodal empathetic conversation-generation system to be correctable.

\* \* \* \* \*